United States Patent [19]
Baik

[11] Patent Number: 5,686,969
[45] Date of Patent: Nov. 11, 1997

[54] METHOD AND APPARATUS FOR ADJUSTING SCREEN SIZE OF TELEVISIONS IN INCREMENTAL STEPS

[75] Inventor: Woon Kil Baik, Kyungsangbook-do, Rep. of Korea

[73] Assignee: LG Electronics, Inc., Seoul, Rep. of Korea

[21] Appl. No.: 524,565

[22] Filed: Sep. 7, 1995

[30] Foreign Application Priority Data

Sep. 7, 1994 [KR] Rep. of Korea .................. 22515/1994

[51] Int. Cl.⁶ ...................................................... H04N 5/46
[52] U.S. Cl. ............................................ 348/556; 348/704
[58] Field of Search .................................. 348/445, 556, 348/734, 704, 555; H04N 5/46

[56] References Cited

U.S. PATENT DOCUMENTS 5,467,142  11/1995  Ichinokawa ............................ 348/556
5,475,442  12/1995  Matsushita et al. ................... 348/556

Primary Examiner—Victor R. Kostak

[57] ABSTRACT

A method for adjusting the screen size in televisions capable of optionally adjusting vertical and horizontal screen size without setting a number of screen size change modes for a variety of source images so that viewers can watch the screen with the desired size. The method includes the steps of determining whether a screen size change key input has been generated and when it has been determined that the screen size change key input was generated, determining whether a screen expansion key input or a screen contraction key input has been generated. When it has been determined that the screen expansion key input was generated, the method includes incrementing horizontal and vertical size data by one step, respectively, thereby expanding the screen size. When it has been determined that no screen expansion key input was generated, the method includes making a determination that a screen contraction key input has been generated, and decrementing the horizontal and vertical size data by one step, thereby reducing the screen size.

19 Claims, 5 Drawing Sheets

| NO | SOURCE IMAGE | ASPECT RATIO |
|---|---|---|
| 1 | STANDARD | 1.38 : 1 = 4 : 3 |
| 2 | HI - VISION | 1.78 : 1 = 16 : 9 |
| 3 | VICTOR SIZE (WIDE SCREEN) | 1.85 : 1 |
| 4 | 70 mm/mm | 2.05 : 1 |
| 5 | PANA VISION | 2.35 : 1 |
| 6 | ULTRA VISION | 2.76 : 1 |

| SCREEN MODE \ DATA | VERTICAL DATA | HORIZONTAL DATA | SIZE EXPANSION RATIO |
|---|---|---|---|
| STANDARD | 10 | 20 | 100 % |
| FULL ZOOM | 20 | 40 | 150 % |
| NUMBER OF TOTAL STEPS | 20 − 10 = 10 STEPS | | |

METHOD AND APPARATUS FOR ADJUSTING SCREEN SIZE OF TELEVISIONS IN INCREMENTAL STEPS

BACKGROUND OF THE INVENTION

1. Field of the Invention

The present invention relates to a technique for adjusting the screen size, of televisions, and more particularly to a method for adjusting the screen size in a wide screen TV capable of adjusting the screen expansion rate so that viewers can watch the screen with the desired size.

2. Description of the Background Art

Referring to FIG. 1, there is illustrated a conventional screen size adjusting apparatus for televisions. As shown in FIG. 1, the apparatus includes a key input unit 100 provided with various keys including a standard mode key, a first expansion mode key and a second expansion mode key as well as general function keys. To the key input unit 100, a microcomputer 3 is coupled which outputs primary color signals R, G and B. The microcomputer 3 fetches data out of a memory 2 in accordance with a key input from the key input unit 1 and outputs vertical and horizontal size control signals CS1 and CS2 corresponding to the fetched data, thereby controlling screen size. The screen size adjusting apparatus also includes an intermediate frequency processing unit 4 for processing an intermediate frequency signal iF to separate it into an audio signal Ai and a video signal Vi. A deflection unit 5 is connected to both the microcomputer 3 and the intermediate frequency processing unit 4. The deflection unit 5 serves to separate the video signal Vi received from the intermediate frequency processing unit 4 into vertical and horizontal synchronous signals Vsyn and Hsyn. In synch with the vertical and horizontal synchronous signals Vsyn and Hsyn, the deflection unit 5 also outputs vertical and horizontal deflection signals in accordance with the vertical and horizontal size control signals CS1 and CS2, respectively, thereby varying voltage levels of vertical and horizontal deflection yokes V-DY and H-DY. The screen size adjusting apparatus further includes a chroma unit 6 for processing the primary color signals R, G and B output from the microcomputer 3 and the video signal Vi output from the intermediate frequency processing unit 4 and thereby generating color difference signals R-Y, G-Y and B-Y which will be scanned to a color Braun tube CPT.

The deflection unit 5 includes a synchronous signal separator 15 for separating the video signal Vi output from the intermediate frequency processing unit 4 into vertical and horizontal synchronous signals Vsyn and Hsyn. A vertical synchronous signal generator 25 is coupled to the synchronous signal separator 15 for generating a vertical synchronous signal Vs in synch with the vertical synchronous signal Vsyn output from the synchronous signal separator 15. To the synchronous signal separator 15, a horizontal synchronous signal generator 35 is also connected which serves to generate a horizontal synchronous signal Hs in synch with the horizontal synchronous signal Hsyn output from the synchronous signal separator 15. The deflection unit 5 also includes a pair of digital/analog (D/A) converters 45 and 55 respectively adapted to convert the vertical and horizontal size control signals CS1 and CS2 output from the microcomputer 3 into analog signals. A vertical sawtooth wave generator 65 and a parabolic wave generator 85 are coupled to the D/A converter 45 and 55, respectively. The vertical sawtooth wave generator 65 generates a sawtooth wave corresponding to the analog signal output from the D/A converter 45, in synch with the vertical synchronous signal Vs generated from the vertical synchronous signal generator 25. On the other hand, the parabolic wave generator 85 generates a parabolic wave corresponding to the analog signal output from the D/A converter 55, in synch with the vertical synchronous signal Vs generated from the vertical synchronous signal generator 25. The sawtooth wave generated from the vertical sawtooth wave generator 65 is sent to a vertical deflection amplifier 75 which amplifies the sawtooth wave to a desired level, thereby varying the voltage level of the vertical deflection yoke V-DY.

The deflection unit 5 further includes a horizontal deflection amplifier 95 for amplifying the parabolic wave generated from the parabolic wave generator 85 to the desired level, in synch with the horizontal synchronous signal Hs from the horizontal synchronous signal generator 35, thereby varying the voltage level of the horizontal deflection yoke H-DY.

FIG. 4 illustrates a conventional method for adjusting the TV screen size by use of the screen size adjusting apparatus shown in FIG. 1. As shown in FIG. 4, the method involves a first procedure of scanning the key input unit 1 and thereby determining whether the current operation mode corresponds to a screen size change mode (Step S1), and a second procedure of, when the current operation mode corresponds to the screen size change mode, determining the screen size change mode, fetching vertical and horizontal size data out of a memory location in the memory 2 corresponding to the determined screen size change mode and outputting vertical and horizontal size control signals respectively corresponding to the fetched vertical and horizontal size data (Step S4).

The second procedure of the screen size adjusting method includes the first step of, when the screen size change mode is determined as a standard mode (Step S2), fetching vertical and horizontal size data out of a predetermined standard mode memory location in the memory 2 (Step S3) and outputting vertical and horizontal size control signals respectively corresponding to the fetched vertical and horizontal size data (Step S4), the second step of, when the screen size change mode is determined as a first expansion mode (Step S5), fetching vertical and horizontal size data out of a predetermined first expansion mode memory location in the memory 2 (Step S6) and outputting vertical and horizontal size control signals respectively corresponding to the fetched vertical and horizontal size data (Step S4), and the third step of, when the screen size change mode is determined as a second expansion mode (Step S7), fetching vertical and horizontal size data out of a predetermined second expansion mode memory location in the memory 2 (Step S8) and outputting vertical and horizontal size control signals respectively corresponding to the fetched vertical and horizontal size data (Step S4).

Now, the procedures of the conventional TV screen size adjusting method carried out using the screen size adjusting apparatus of FIG. 1 will be described in detail in conjunction with FIGS. 2 to 4.

In broadcast stations, source images having a variety of aspect ratios in Standard, Hi-vision, Victor size, 70 mm/mm, Pana vision, and Ultra vision systems as indicated in FIG. 2 are typically re-made by appropriately cutting them such that their aspect ratio is changed into that of 4:3 enabling them to be displayed on the TV screen.

In the case of a Victor size source image, for example, its portion A shown in FIG. 3 can be displayed on the TV screen after the above-mentioned re-making process. In the case of a 70 mm/mm source image, its portion B can be displayed on the TV screen.

Meanwhile, wide screen TV's have screen size change mode keys respectively corresponding to different source images including standard, Hi-vision, Victor size, 70 mm/mm, Pana vision, and Ultra vision as indicated in FIG. 2. In this case, these screen size change mode keys are provided at the key input unit 1. As a user manipulates a selected one of the screen size change mode keys, he can view a source image with a selected screen size. This will be described in more detail.

For simplicity of the description, the following description is made in conjunction with a case wherein only three screen size change mode keys, namely, a standard mode key, a first expansion mode key and a second expansion mode key are provided which correspond to standard, Victor size and 70 m/m source images, respectively.

When the user desires to change the screen size of the wide screen TV into that of a required source image, he manipulates a selected one of the screen size change mode keys, namely, the standard mode key, the first expansion mode key and the second expansion mode key all provided at the key input unit 1 so that a required key input can be applied to the microcomputer 3. In response to the key input, the microcomputer 3, which checks whether the current operation mode corresponds to the screen size change mode (Step S1) as shown in FIG. 4, determines the current operation mode as the screen size change mode.

Where the screen size change mode is determined as the standard mode (Step S2), the microcomputer 3 fetches vertical and horizontal size data from a predetermined memory location of the memory 2 corresponding to the standard mode (Step S3). Thereafter, the microcomputer 3 outputs vertical and horizontal size control signals CS1 and CS2 respectively corresponding to the fetched vertical and horizontal size data (Step S4).

Where the screen size change mode is determined as the first expansion mode (Step S5), the microcomputer 3 fetches vertical and horizontal size data from a predetermined memory location of the memory 2 corresponding to the first expansion mode (Step S6). Thereafter, the microcomputer 3 outputs vertical and horizontal size control signals CS1 and CS2 respectively corresponding to the fetched vertical and horizontal size data (Step S4).

On the other hand, when the screen size change mode is determined as the second expansion mode (Step S7), the microcomputer 3 fetches vertical and horizontal size data from a predetermined memory location of the memory 2 corresponding to the second expansion mode (Step S8). Thereafter, the microcomputer 3 outputs vertical and horizontal size control signals CS1 and CS2 respectively corresponding to the fetched vertical and horizontal size data (Step S4).

The vertical and horizontal size control signals CS1 and CS2 output from the microcomputer 3 pass through the D/A converters 45 and 55 of the deflection unit 5, respectively, so that they are converted into analog signals.

Meanwhile, the intermediate frequency processing unit 4 separates an audio signal Ai and a video signal Vi from an intermediate frequency signal iF.

The video signal Vi from the intermediate frequency processing unit 4 is applied to the synchronous signal separator 15 of the deflection unit 5 which, in turn, separates vertical and horizontal synchronous signals Vsyn and Hsyn from the video signal Vi.

The vertical synchronous signal generator 25 receives the vertical synchronous signal Vsyn output from the synchronous signal separator 15, thereby outputting a vertical synchronous signal Vs. On the other hand, the horizontal synchronous signal generator 35 receives the horizontal synchronous signal Hsyn output from the synchronous signal separator 15, thereby outputting a horizontal synchronous signal Hs.

In synch with the vertical synchronous signal Vs output from the vertical synchronous signal generator 25, the vertical sawtooth wave generator 65 generates a sawtooth wave corresponding to the analog signal output from the D/A converter 45. The sawtooth wave from the vertical sawtooth wave generator 65 is then sent to the vertical deflection amplifier 75 which, in turn, amplifies the sawtooth wave to the desired level. The amplified sawtooth wave is then applied to the vertical deflection yoke V-DY, thereby varying the voltage level of the vertical deflection yoke.

On the other hand, the parabolic wave generator 85 generates a parabolic wave corresponding to the analog signal output from the D/A converter 55, in synch with the vertical synchronous signal Vs output from the vertical synchronous signal generator 25. The parabolic wave from the parabolic wave generator 85 is then sent to the horizontal deflection amplifier 95. In synch with the horizontal synchronous signal Hs from the horizontal synchronous signal generator 35, the horizontal deflection amplifier 95 amplifies the vertical parabolic wave to the desired level. The amplified parabolic wave is then applied to the horizontal deflection yoke H-DY, thereby varying the voltage level of the horizontal deflection yoke.

The video signal Vi from the intermediate frequency processing unit 4 is applied to the chroma unit 6 which also receives primary color signals R, G and B from the microcomputer 3. The chroma unit 6 processes the received video and primary color signals, thereby generating color difference signals R-Y, G-Y and B-Y which are, in turn, scanned to the Braun tune CPT.

At this time, the screen size is varied in accordance with the selected screen size change mode. In the first expansion mode, for example, the image is displayed on the Braun tube CPT under the condition that its horizontal and vertical sizes are expanded by about 30%, respectively. In the second expansion mode, the image is displayed on the Braun tube CPT under the condition that its horizontal and vertical sizes are expanded by about 40%, respectively.

For achieving the change in aspect ratio for a variety of source images having different horizontal and vertical expansion ratios, however, the conventional TV screen size adjusting apparatus and method require a variety of screen size change modes respectively associated with the various source images. For this reason, the conventional apparatus and method involve a problem that for a special source image, screen size change may not be achieved unless a screen size change mode is previously set for the source image.

Since a variety of screen size change modes respectively associated with a variety of source images should be set, the conventional apparatus and method involve a troublesome aspect ratio change operation. Furthermore, it is impossible to realize setting a number of screen size change modes for all possible source images.

SUMMARY OF THE INVENTION

Therefore, an object of the invention is to provide a method for adjusting the screen size in televisions capable of optionally adjusting vertical and horizontal screen size without setting a number of screen size change modes for a variety of source images so that viewers can watch the screen with the desired size.

In accordance with the present invention, this object is accomplished by providing a method for adjusting the screen size in a television, comprising the steps of: (A) determining whether a screen size change key input has been generated; (B) when it has been determined in the step (A) that the screen size change key input was generated, determining whether a screen expansion key input has been generated; (C) when it has been determined in the step (B) that the screen expansion key input was generated, incrementing horizontal and vertical data by one step, respectively, thereby expanding the screen size; and (D) when it has been determined in the step (B) that no screen expansion key input was generated, making a determination that a screen contraction key input has been generated, and decrementing the horizontal and vertical size data by one step, thereby reducing the screen size.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 7:
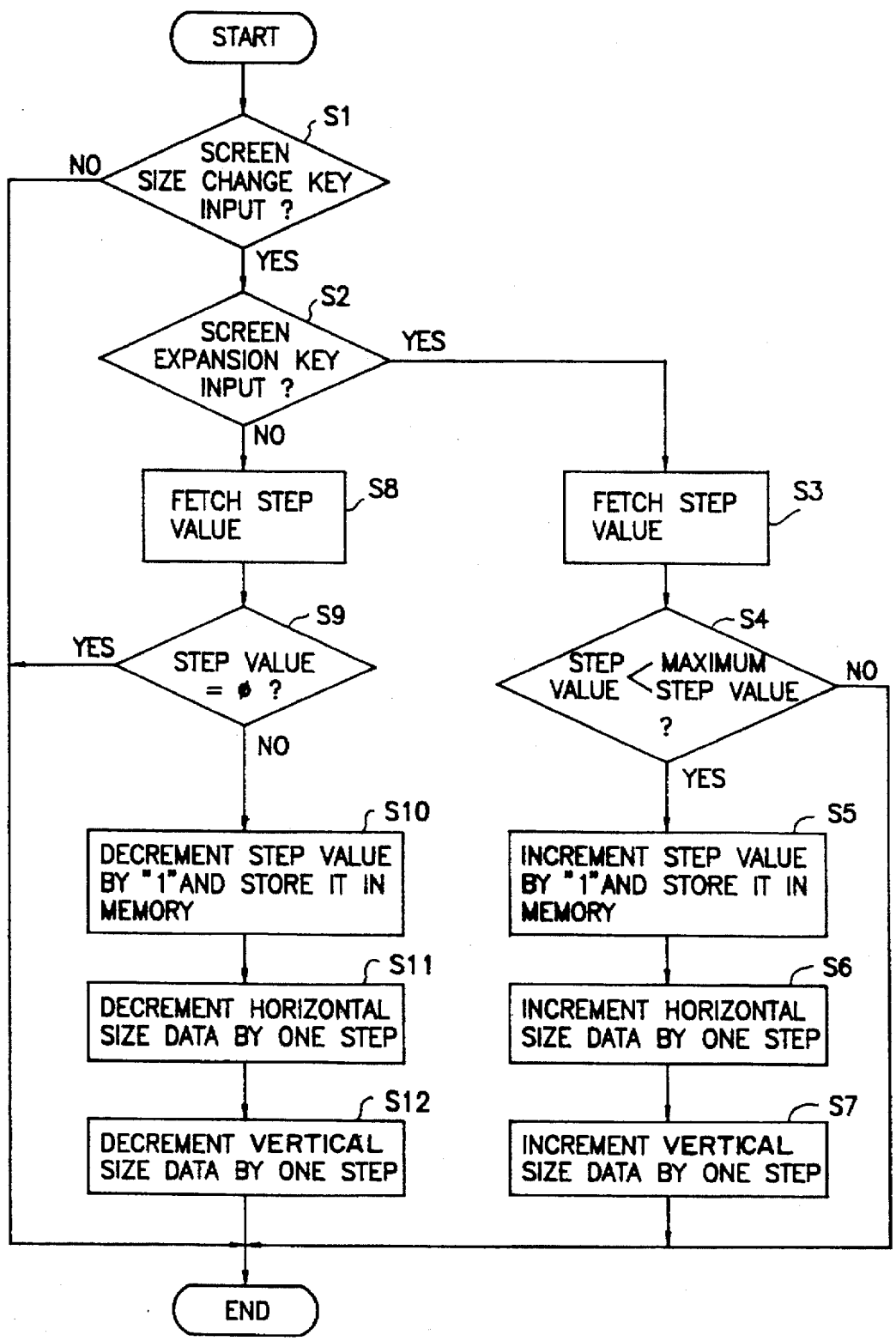
FIG. 7 is a flow chart illustrating a television screen size adjusting method of the present invention.

Referring to FIG. 7, there is illustrated a method for adjusting the screen size in televisions in accordance with the present invention.

As shown in FIG. 7, the screen size adjusting method of the present invention includes four procedures, namely, the first procedure of determining whether a screen size change key signal has been input (Step S1), the second procedure of, when it has been determined in the first procedure that the screen size change key signal was input, determining whether a screen expansion key signal has been input (Step S2), the third procedure of, when it has been determined in the second procedure that the screen expansion key signal was input, incrementing horizontal and vertical size data by one step, respectively, thereby expanding the screen size, and the fourth procedure of, when it has been determined in the second procedure that no screen expansion key signal was input, making a determination that a screen contraction key signal has been input, and decrementing the horizontal and vertical size data by one step, thereby reducing the screen size.

The third procedure includes two steps, namely, the first step of fetching a current step value when the screen expansion key signal has been input (Step S3) and determining whether the current step value is less than a predetermined maximum step value (Step S4), and the second step of, when it has been determined at the first step that the current step value is less than the predetermined maximum step value, incrementing the current step value by one (Step S5) and incrementing the horizontal and vertical size data by one step, respectively (Steps S6 and S7), while completing the screen size adjusting procedure when it has been determined at the first step that the current step value is not less than the predetermined maximum step value.

On the other hand, the fourth procedure includes two steps, namely, the first step of fetching a current step value when no screen expansion key signal has been input, that is, when a screen contraction key signal has been input (Step S8) and determining whether the current step value corresponds to "0" (Step S9), and the second step of, when it has been determined at the first step that the current step value does not correspond to "0", decrementing the current step value by one (Step S10) and decrementing the horizontal and vertical size data by one step, respectively (Steps S11 and S12), while completing the screen size adjusting procedure when the current step value corresponds to "0".

Now, the screen size adjusting procedure in accordance with the present invention will be described in conjunction with FIGS. 5 to 7.

In accordance with the present invention, a pair of screen size change keys are used, one of which is the screen expansion key while the other being the screen contraction key. Every time the user presses the screen expansion key or the screen contraction key, the controlled width of the screen size is adjusted.

This will be described in more detail in conjunction with the case shown in FIG. 5. In the case of FIG. 5, vertical and horizontal size data for the standard screen are predetermined to have step values of 10 and 20. Also, the maximum expansion (full zoom) vertical and horizontal size data are predetermined to have step values of 20 and 40, respectively. Every time the user inputs a screen expansion key signal or a screen contraction key signal, vertical size data is incremented or decremented in step value by one while horizontal size data is incremented or decremented in step value by two. At a step value less than that for the standard screen size or more than the maximum (full zoom) screen size, the screen size adjusting procedure is completed without any increment or decrement of step. This is because it is unnecessary to display the image at the step value less than that for the standard screen size or more than the maximum (full zoom) screen size.

Step values of vertical and horizontal size data for screen size adjustment may be optionally determined. Also, increment and decrement of the vertical and horizontal size data per step may be optionally determined.

When the user inputs a selected screen size change key signal, namely, the screen expansion key signal or the screen contraction key signal, the microcomputer recognizes the inputting of the screen size change key signal (Step S1) and then determines whether the screen expansion key signal has been input (Step S2).

Where it is determined at step S2 that the screen expansion key signal has been input, the microcomputer fetches the current step value stored in the memory (step S3) and then compares the fetched step value with a predetermined maximum step value to determine whether the current step value is less than the maximum step value (Step S4).

Figure 1:
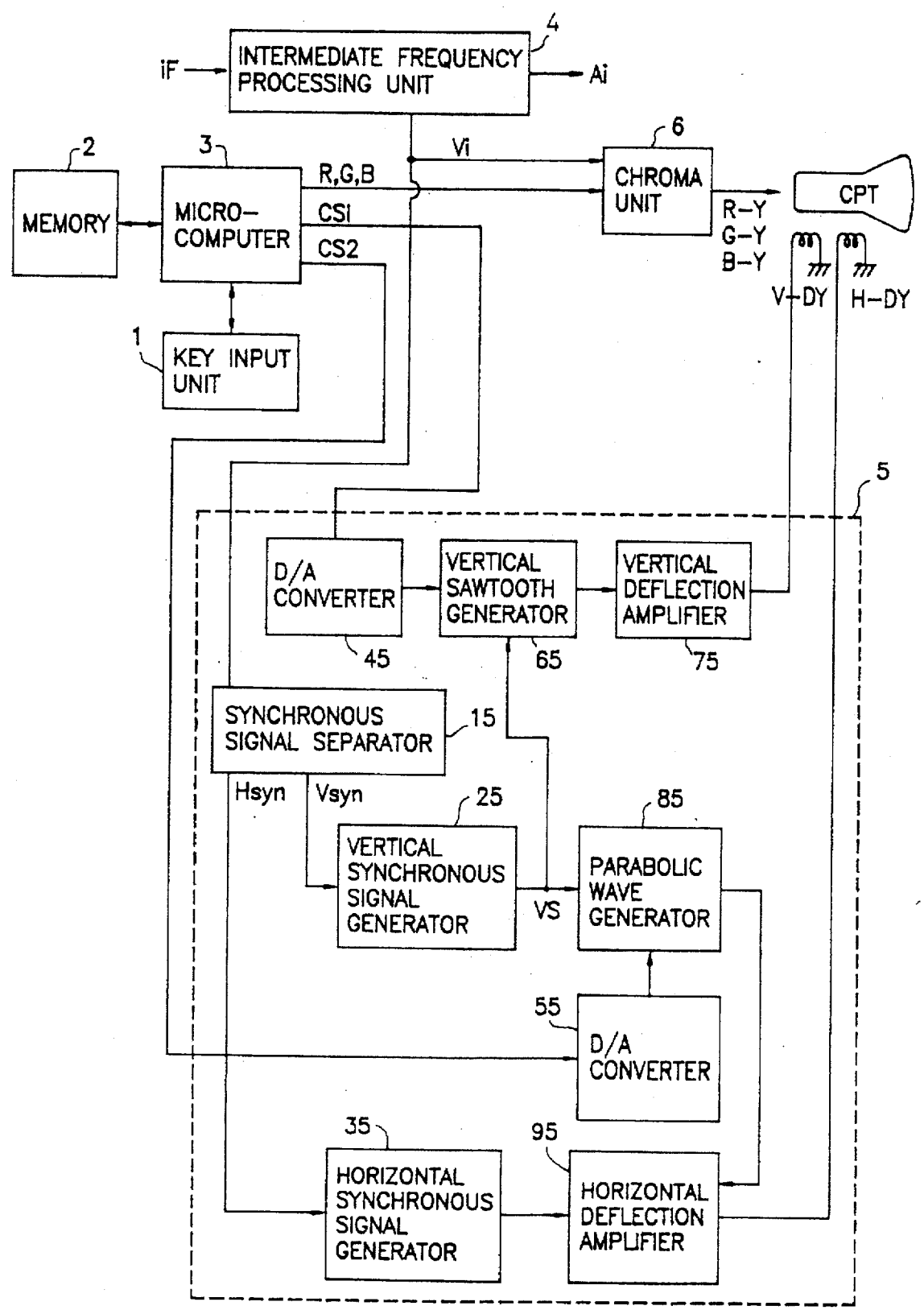
FIG. 1 is a block diagram illustrating a conventional screen size adjusting apparatus for televisions.
Figures 2, 3:
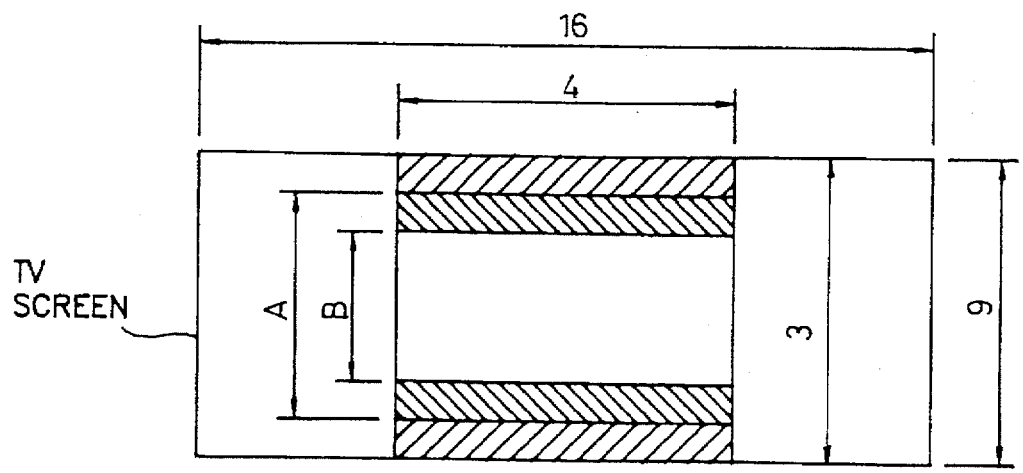
FIG. 2 is a table showing aspect ratios of various source images applied to the apparatus of FIG. 1.
FIG. 3 is a schematic view illustrating a television screen to explain a screen size adjusting operation of the apparatus shown in FIG. 1.
Figure 4:
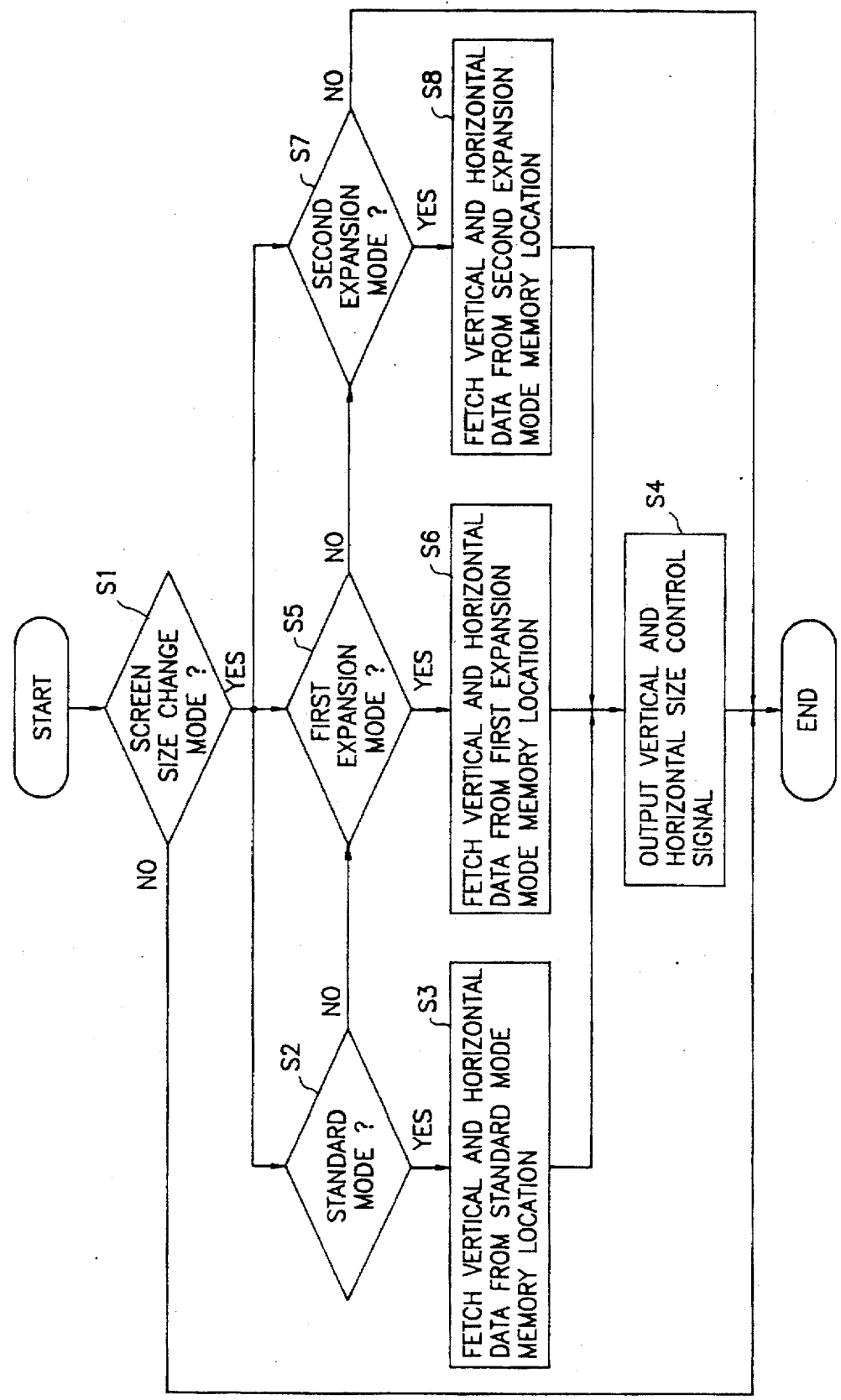
FIG. 4 is a flow chart illustrating a conventional screen size adjusting method carried out using the apparatus of FIG. 1.
Figures 5, 6:
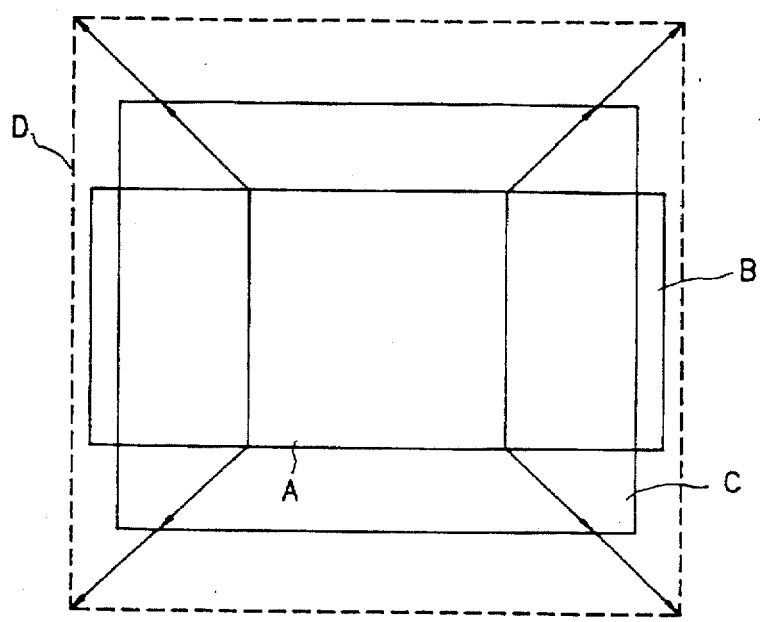
FIG. 5 is a data table for explaining a television screen size adjusting method in accordance with the present invention.
FIG. 6 is a schematic view illustrating expansion and contraction of a television screen size in accordance with a method of the present invention.

When it is determined at step S4 that the current step value is not less than the maximum step value, the screen size adjusting procedure is completed without any expansion of the screen because the current screen size corresponds to the maximum screen size as indicated by "D" in FIG. 6.

On the other hand, where it is determined at step S4 that the current step value is less than the maximum step value, the current step value is incremented by one (Step S5). In this case, vertical and horizontal size data are incremented by one step, respectively, thereby expanding the screen size (Steps S6 and S7).

When it is determined at step S2 that no screen expansion Key signal has been input, it is determined that the screen contraction Key signal has been input. In this case, the microcomputer fetches the current step value stored in the memory and then compares the fetched step value with "0" to determine whether the current step value corresponds to "0" (Step S9).

When it is determined at step S9 that the current step value corresponds to "0", the screen size adjusting procedure is completed because the current screen size corresponds to the standard screen size as indicated by "A" in FIG. 6, which requires no contraction of screen size. If the current step value does not correspond to "0", it is then decremented by one (Step S10). In this case, horizontal and vertical size data are decremented by one step, respectively (Steps S11 and S12).

As apparent from the above description, the present invention provides a method for adjusting the screen size in televisions capable of optionally adjusting vertical and horizontal screen size without setting a number of screen size change modes for a variety of source images so that viewers can watch the screen with the desired size.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for adjusting screen size in a television, comprising the steps of:

(A) determining whether a screen size change key input has been generated;

(B) when it is determined in said step (A) that the screen size change key input has been generated, determining whether a screen expansion key input has been generated;

(C) when it is determined in said step (B) that the screen expansion key input has been generated, incrementing horizontal and vertical size data by one step, respectively, thereby expanding the screen size; and (D) when it is determined in said step (B) that the screen expansion key input was not generated, making a determination that a screen contraction key input has been generated, and decrementing the horizontal and vertical size data by one step, respectively, thereby reducing the screen size.

2. The method in accordance with claim 1, wherein said step (C) comprises the steps of:

(C1) fetching a current step value when the screen expansion key input has been generated and determining whether the current step value is less than a predetermined maximum step value;

(C2) when it has been determined in said step (C1) that the current step value is less than the predetermined maximum step value, incrementing the current step value by one and incrementing the horizontal and vertical size data by one step, respectively; and (C3) when it has been determined in said step (C1) that the current step value is not less than the predetermined maximum step value, completing the screen size adjusting procedure.

3. The method in accordance with claim 1, wherein said step (D) comprises the steps of:

(D1) fetching a current step value when the screen contraction key input has been generated and determining whether the current step value corresponds to zero;

(D2) when it has been determined in said step (D1) that the current step value does not correspond to zero, decrementing the current step value by one and decrementing the horizontal and vertical size data by one step, respectively; and (D3) when it has been determined in said step (D1) that the current step value corresponds to zero, completing the screen size adjusting procedure.

4. A screen size adjustment system comprising:

a memory for storing horizontal and vertical size data and a step count;

input means for generating a screen size change input; and control means for determining if the screen size change input is a screen expansion input or a screen contraction input, incrementing the horizontal and vertical size data by a step value and incrementing the step count if the screen size change input is determined to be a screen expansion input, and decrementing the horizontal and vertical size data by the step value and decrementing the step count if the screen size change input is determined to be a screen contraction input.

5. The screen size adjustment system of claim 4, wherein the step value comprises a horizontal step value for incrementing and decrementing the horizontal size data and a vertical step value for incrementing and decrementing the vertical size data.

6. The screen size adjustment system of claim 5, wherein the horizontal step value does not equal the vertical step value.

7. The screen size adjustment system of claim 4, wherein when the screen size change input is determined to be a screen expansion input, said control means compares the step count to a maximum step count and if the step count is less than the maximum step count, increments the horizontal and vertical size data by the step value and increments the step count.

8. The screen size adjustment system of claim 7, wherein if the step count is determined to be not less than the maximum step count, said control means maintains the horizontal and vertical size data and the step count.

9. The screen size adjustment system of claim 4, wherein when the screen size change input is determined to be a screen contraction input, said control means compares the step count to zero and if the step count is greater than zero, decrements the horizontal and vertical size data by the step value and decrements the step count.

10. The screen size adjustment of claim 9, wherein if the step count is determined to be zero, said control means maintains the horizontal and vertical size data and the step count.

11. The screen size adjustment system of claim 4, wherein the horizontal and vertical size data are horizontal and vertical television screen size data, respectively.

12. A method of screen size adjustment comprising the steps of:

a) storing horizontal and vertical size data and a step count;

b) determining if a screen size change input is a screen expansion input or a screen contraction input;

c) incrementing the horizontal and vertical size data by a step value and incrementing the step count if the screen size change input is determined to be a screen expansion input in said step b); and d) decrementing the horizontal and vertical size data by the step value and decrementing the step count if the screen size change input is determined to be a screen contraction input in said step b).

13. The method of screen size adjustment of claim 12, wherein said steps c) and d) comprise incrementing and decrementing the horizontal size data and the vertical size data by a horizontal step value and a vertical step value, respectively.

14. The method of screen size adjustment of claim 13, wherein the horizontal step value does not equal the vertical step value.

15. The method of screen size adjustment of claim 12, wherein said step c) comprises:

c1) comparing the step count to a maximum step count; and c2) incrementing the horizontal and vertical size data by the step value and incrementing the step count if the step count is determined to be less than the maximum step count in said step c1).

16. The method of screen size adjustment of claim 15, wherein said step c) further comprises:

c3) maintaining the horizontal and vertical size data and the step count if the step count is determined to be equal to the maximum step count in said step c1).

17. The method of screen size adjustment of claim 12, wherein said step d) comprises:

d1) comparing the step count to zero; and d2) decrementing the horizontal and vertical size data by the step value and decrementing the step count if the step count is determined to be greater than zero in said step d1).

18. The method of screen size adjustment of claim 17, wherein said step d) further comprises:

d3) maintaining the horizontal and vertical size data and the step count if the step count is determined to be equal to zero in said step d1).

19. The method of screen size adjustment of claim 12, wherein the horizontal and vertical size data comprise horizontal and vertical television screen size data, respectively.

* * * * *